US011929550B2

(12) United States Patent
Ma et al.

(10) Patent No.: US 11,929,550 B2
(45) Date of Patent: Mar. 12, 2024

(54) WIRELESS COMMUNICATION CONNECTOR AND COMMUNICATION MODULE COMPRISING SAME

(71) Applicant: Samsung Electronics Co., Ltd., Suwon-si (KR)

(72) Inventors: Yiwei Ma, Guangdong (CN); Rongbiao Su, Guangdong (CN); Yuanwei Wang, Guangdong (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 17/273,833

(22) PCT Filed: Aug. 21, 2019

(86) PCT No.: PCT/KR2019/010626

§ 371 (c)(1),
(2) Date: Mar. 5, 2021

(87) PCT Pub. No.: WO2020/075968

PCT Pub. Date: Apr. 16, 2020

(65) Prior Publication Data

US 2021/0328333 A1 Oct. 21, 2021

(30) Foreign Application Priority Data

Oct. 10, 2018 (CN) ......................... 201821641823.2

(51) Int. Cl.
*H01Q 1/24* (2006.01)
*H01Q 1/38* (2006.01)
(Continued)

(52) U.S. Cl.
CPC ............... *H01Q 1/38* (2013.01); *H01R 13/24* (2013.01); *H01R 13/405* (2013.01); *H01R 13/502* (2013.01)

(58) Field of Classification Search
CPC .... H01P 5/085; H01P 5/08; H01P 5/10; H01P 5/103; H01Q 1/24; H01Q 1/38;
(Continued)

(56) References Cited

U.S. PATENT DOCUMENTS 4,964,805 A * 10/1990 Gabany ................. H01R 24/50 439/434
6,358,072 B1 * 3/2002 Johnson ................ H01R 13/53 439/126
(Continued)

FOREIGN PATENT DOCUMENTS

CN 207010690 U 2/2018
JP 2009-302990 A 12/2009
(Continued)

OTHER PUBLICATIONS

International Search Report dated Nov. 25, 2019, issued in International Application No. PCT/KR2019/010626.

*Primary Examiner* — Tho G Phan
(74) *Attorney, Agent, or Firm* — Jefferson IP Law, LLP

(57) ABSTRACT

A radio frequency (RF) connector includes an insulating portion configured in a cylindrical shape; an outer conducting portion configured in a cylindrical shape and disposed to surround an outer circumferential surface of the insulating portion; and an inner conducting portion disposed inside the insulating portion in a hollow shape and having both ends protruding from the insulating portion, the insulating portion electrically separating the outer conducting portion from the inner conducting portion.

18 Claims, 5 Drawing Sheets

(51) Int. Cl.
*H01R 13/24* (2006.01)
*H01R 13/405* (2006.01)
*H01R 13/502* (2006.01)

(58) Field of Classification Search
CPC ........ H01R 9/05; H01R 12/714; H01R 12/22; H01R 13/24; H01R 13/2421; H01R 13/405; H01R 13/502; H01R 24/50
See application file for complete search history.

(56) References Cited

U.S. PATENT DOCUMENTS

| | | | | |
|---|---|---|---|---|
| 8,235,750 | B2 * | 8/2012 | Osaki | H01R 24/54 439/219 |
| 8,298,007 | B2 * | 10/2012 | Taguchi | H01R 24/50 439/578 |
| 9,130,328 | B1 * | 9/2015 | Huang | H01R 13/2421 |
| 10,164,384 | B2 * | 12/2018 | Maruyama | H01R 24/50 |
| 11,088,497 | B2 * | 8/2021 | Hsiao | H01R 13/6594 |
| 11,539,148 | B2 * | 12/2022 | Barthelmes | H01R 9/0521 |
| 2009/0311981 | A1 | 12/2009 | Noro et al. | |
| 2010/0255688 | A1 | 10/2010 | Steinkamp et al. | |
| 2015/0207277 | A1 | 7/2015 | Sun et al. | |

FOREIGN PATENT DOCUMENTS

| | | | |
|---|---|---|---|
| JP | 2015-529000 | A | 10/2015 |
| KR | 10-2008-0082758 | A | 9/2008 |
| KR | 10-2008-0107362 | A | 12/2008 |
| KR | 10-1166431 | B1 | 7/2012 |
| KR | 10-1301772 | B1 | 8/2013 |

* cited by examiner

WIRELESS COMMUNICATION CONNECTOR AND COMMUNICATION MODULE COMPRISING SAME

TECHNICAL FIELD

The present disclosure relates to communication technologies, and particularly to a radio frequency (RF) connector and a communication module including the RF connector.

BACKGROUND ART

A radio frequency (RF) connector is assembled together with a filter and a printed circuit board (PCB) to form a communication module. An RF connector of the related art includes a first connector, a second connector, and a connection rod. The first connector and the second connector are assembled on the filter and the PCB, respectively. The first connector and the second connector are connected to each other through the connection rod. The RF connector of the related art has a relatively complicated and large-sized structure and a certain requirement may be necessary to provide assembly spacing when the RF connector is assembled on the filter and the PCB. Accordingly, it may be difficult to meet the design requirements for minimizing the RF connector and the communication module.

DESCRIPTION OF EMBODIMENTS

Technical Problem

Provided is a radio frequency (RF) connector and a communication module including the RF connector, wherein a structure of the RF connector may be simplified and the size of the RF connector may be reduced, thereby meeting the design requirements for miniaturization and low-cost.

Solution to Problem

According to an aspect of the present disclosure, a radio frequency (RF) connector includes an insulating portion configured in a cylindrical shape; an outer conducting portion configured in a cylindrical shape and disposed to surround an outer circumferential surface of the insulating portion; and an inner conducting portion disposed inside the insulating portion in a hollow shape and having both ends protruding from the insulating portion, the insulating portion electrically separating the outer conducting portion and the inner conducting portion from each other.

The outer conducting portion may include a metal shell disposed to surround outer circumferential surface of the insulating portion; and an elastic conductive connector disposed in a part of the metal shell and electrically connected to the metal shell.

The elastic conductive connector may include a cylindrical body disposed between the metal shell and the insulating portion; and an elastic electrical contact protruding from one end of the cylindrical body.

The elastic electrical contact may include a plurality of elastic electrical contacts, the plurality of elastic electrical contacts being disposed along one end of the cylindrical body to be spaced apart from each other by a certain distance, and inclined at a certain angle with respect to an outer wall of the cylindrical body.

The RF connector may further include a card slot disposed in any one of an inner wall of the cylindrical body and an outer wall of the insulating portion; and a bulge portion disposed on the other one of the inner wall of the cylindrical body and the outer wall of the insulating portion and inserted into the card slot.

The elastic electrical contact may include a bent flange inclined at a certain angle with respect to an outer wall of the cylindrical body.

The inner conducting portion may include a conductive column extending in one direction; a connecting tube into which the conductive column is inserted through an open end; and an elastic inner conductive connector disposed between the conductive column and a closed bottom portion of the connecting tube facing one end of the connecting tube, the elastic inner conductive connector electrically connecting the conductive column to the connecting tube.

One end of the conductor column protruding from one end of the connecting tube may be a first electrical connecting portion; and the other end of the connecting tube protruding from the insulating portion may be a second electrical connecting portion.

The elastic inner conductive connector may be an elastic member disposed between the conductive column and the bottom portion of the connecting tube and compressed or tensioned.

According to an aspect of the present disclosure, a communication module includes an RF connector; a filter electrically connected to the RF connector; and a printed circuit board (PCB) electrically connected to the RF connector, the RF connector includes an insulating portion configured in a cylindrical shape; an outer conducting portion configured in a cylindrical shape and disposed to surround an outer circumferential surface of the insulating portion; and an inner conducting portion disposed inside the insulating portion in a hollow shape and having both ends protruding from the insulating portion, the insulating portion may electrically separating the outer conducting portion and the inner conducting portion from each other.

The outer conducting portion may be electrically connected to the PCB, one end of the inner conducting portion may be electrically connected to filter, and the other end of the inner conducting portion may be electrically connected to the PCB.

The PCB may include an inner conductive connecting portion and an outer conductive connecting portion disposed to surround the inner conductive connecting portion, and the inner conductive connecting portion may be electrically connected to the other end of the inner conducting portion, and the outer conductive connecting portion may be electrically connected to the outer conducting portion.

The outer conducting portion may include a metal shell disposed to surround outer circumferential surface of the insulating portion; and an elastic conductive connector disposed in a part of the metal shell and electrically connected to the metal shell.

The elastic conductive connector may include a cylindrical body disposed between the metal shell and the insulating portion; and an elastic electrical contact protruding from one end of the cylindrical body.

The elastic electrical contact may be electrically connected in a circumferential direction of the outer conductive connecting portion included in the PCB.

The elastic electrical contact may include a plurality of elastic electrical contacts, the plurality of elastic electrical contacts being disposed along one end of the cylindrical body to be spaced apart from each other by a certain distance, and inclined at a certain angle with respect to an outer wall of the cylindrical body.

The communication module may further include a card slot disposed in any one of an inner wall of the cylindrical body and an outer wall of the insulating portion; and a bulge portion disposed on the other one of the inner wall of the cylindrical body and the outer wall of the insulating portion and inserted into the card slot.

The elastic electrical contact may include a bent flange inclined at a certain angle with respect to an outer wall of the cylindrical body.

The inner conducting portion may include a conductive column extending in one direction; a connecting tube into which the conductive column is inserted through an open end; and an elastic inner conductive connector disposed between the conductive column and a closed bottom portion of the connecting tube facing one end of the connecting tube, wherein the elastic inner conductive connector may electrically connect the conductive column to the connecting tube.

According to an aspect of the present disclosure, a base station device includes a RF module; and a communication module configured to transmit at least one of data and a signal through the RF module and a specific interface defined on a packet basis, the communication module includes an RF connector; a filter electrically connected to the RF connector; and a printed circuit board (PCB) electrically connected to the RF connector, and the RF connector includes an insulating portion configured in a cylindrical shape; an outer conducting portion configured in a cylindrical shape and disposed to surround an outer circumferential surface of the insulating portion; and an inner conducting portion disposed inside the insulating portion in a hollow shape and having both ends protruding from the insulating portion, wherein the insulating portion may electrically separate the outer conducting portion and the inner conducting portion from each other.

Advantageous Effects of Disclosure

A radio frequency (RF) connector and a communication module including the RF connector may simplify a structure of the RF connector and reduce the size of the RF connector, thereby meeting the design requirements of miniaturization and low-cost.

MODE OF DISCLOSURE

Figure 1:
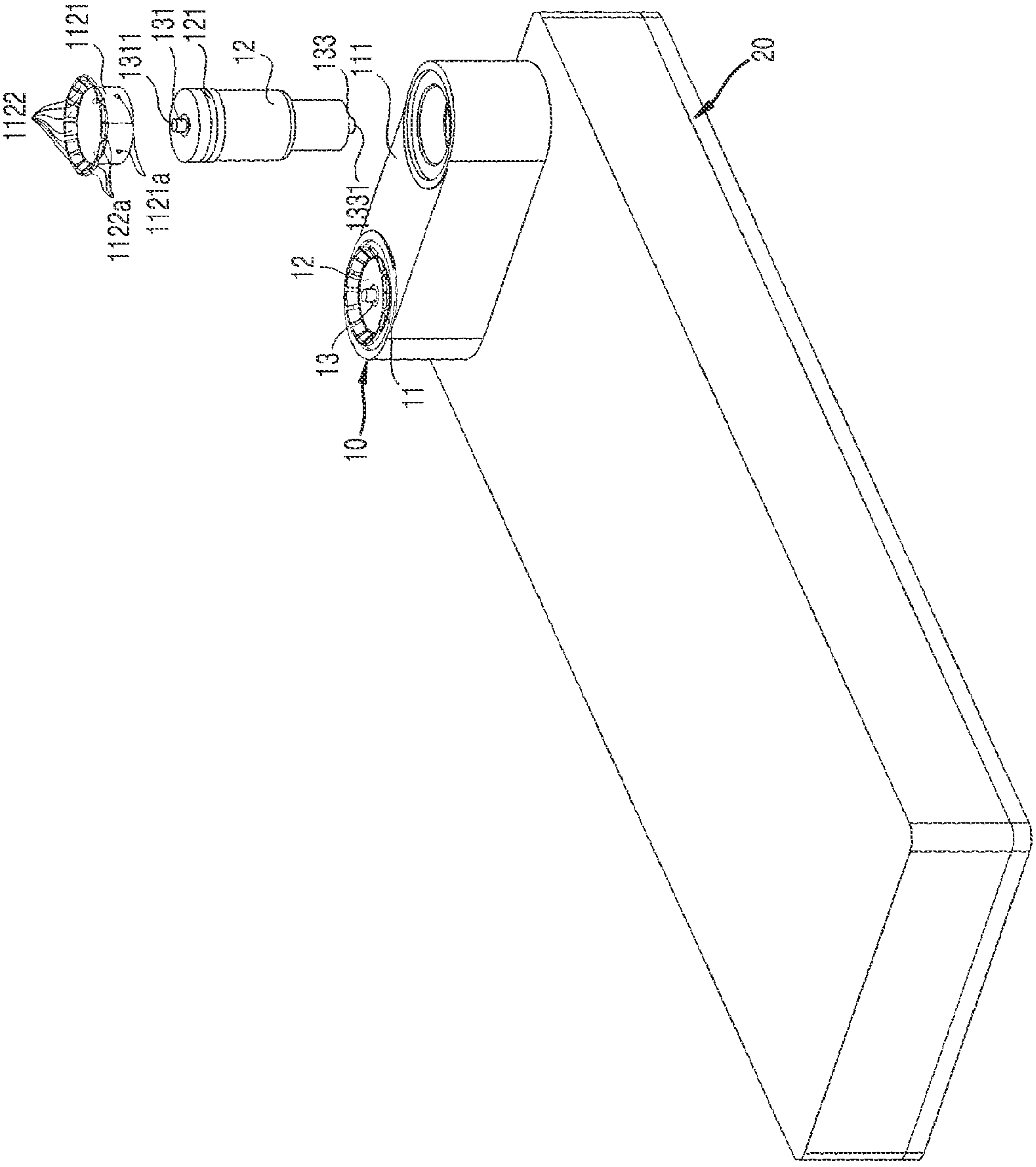
FIG. 1 is a perspective view of a radio frequency (RF) connector and a filter according to an embodiment.

Hereinafter, the configuration and operation of the disclosure will be described in detail through embodiments of the accompanying drawings.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the specification, when a portion "includes" an element, unless otherwise described, another element may be further included, rather than the presence of other elements being excluded.

In addition, terms such as "first, second" are not used in a limited sense, but for the purpose of distinguishing one component from other components.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

In order to describe structure of a radio frequency (RF) connector provided by the present disclosure in detail, following is an example of assembling the RF connector to a filter and a printed circuit board (PCB). The example describes the structure and an assembly relationship of the RF connector with the filter and the PCB in detail.

Figure 2:
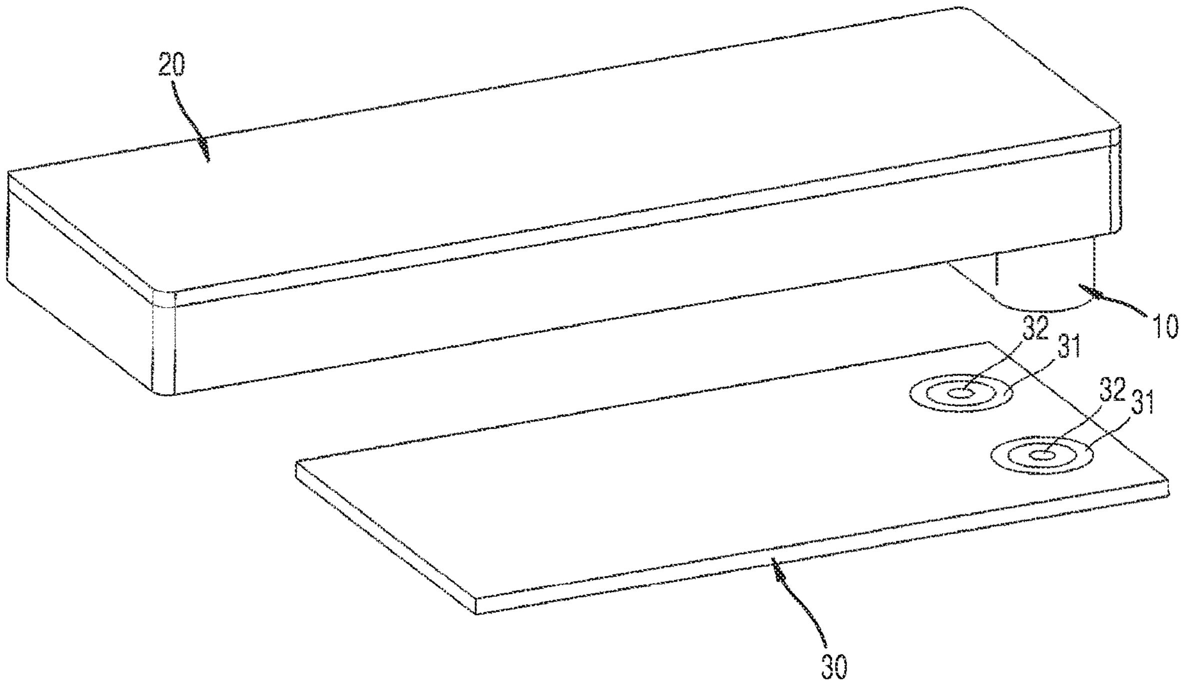
FIG. 2 is a perspective view of a RF connector, a filter, and a printed circuit board (PCB) according to an embodiment.
Figure 3:
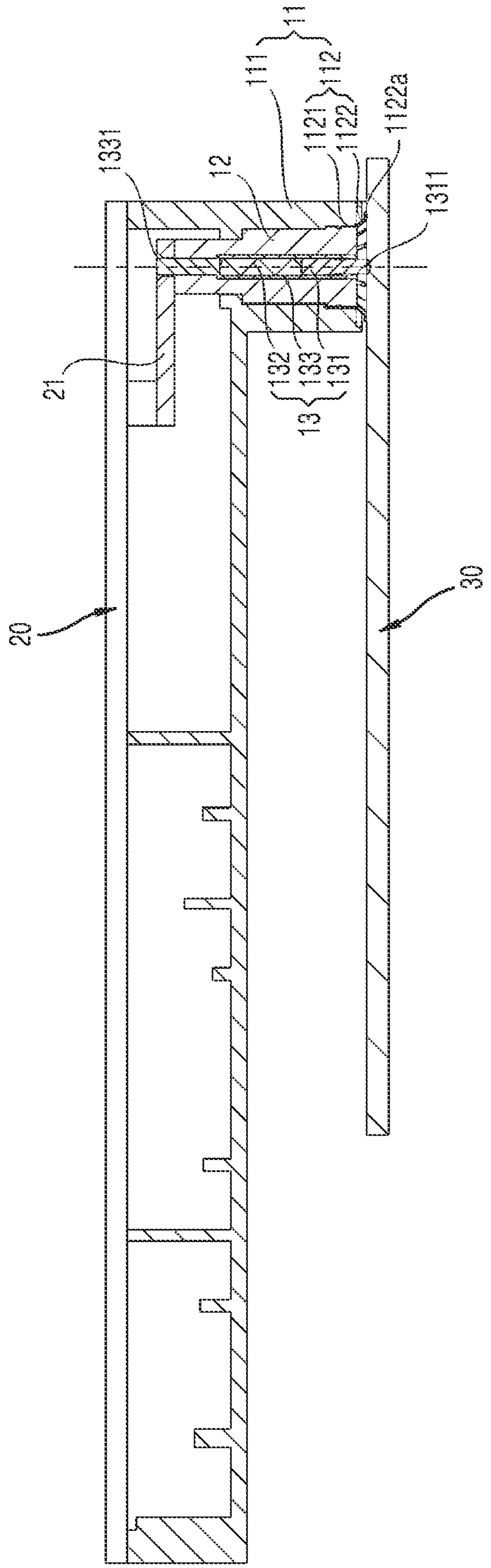
FIG. 3 is a cross-sectional view of a RF connector, a filter, and a PCB according to an embodiment.
Figure 4:
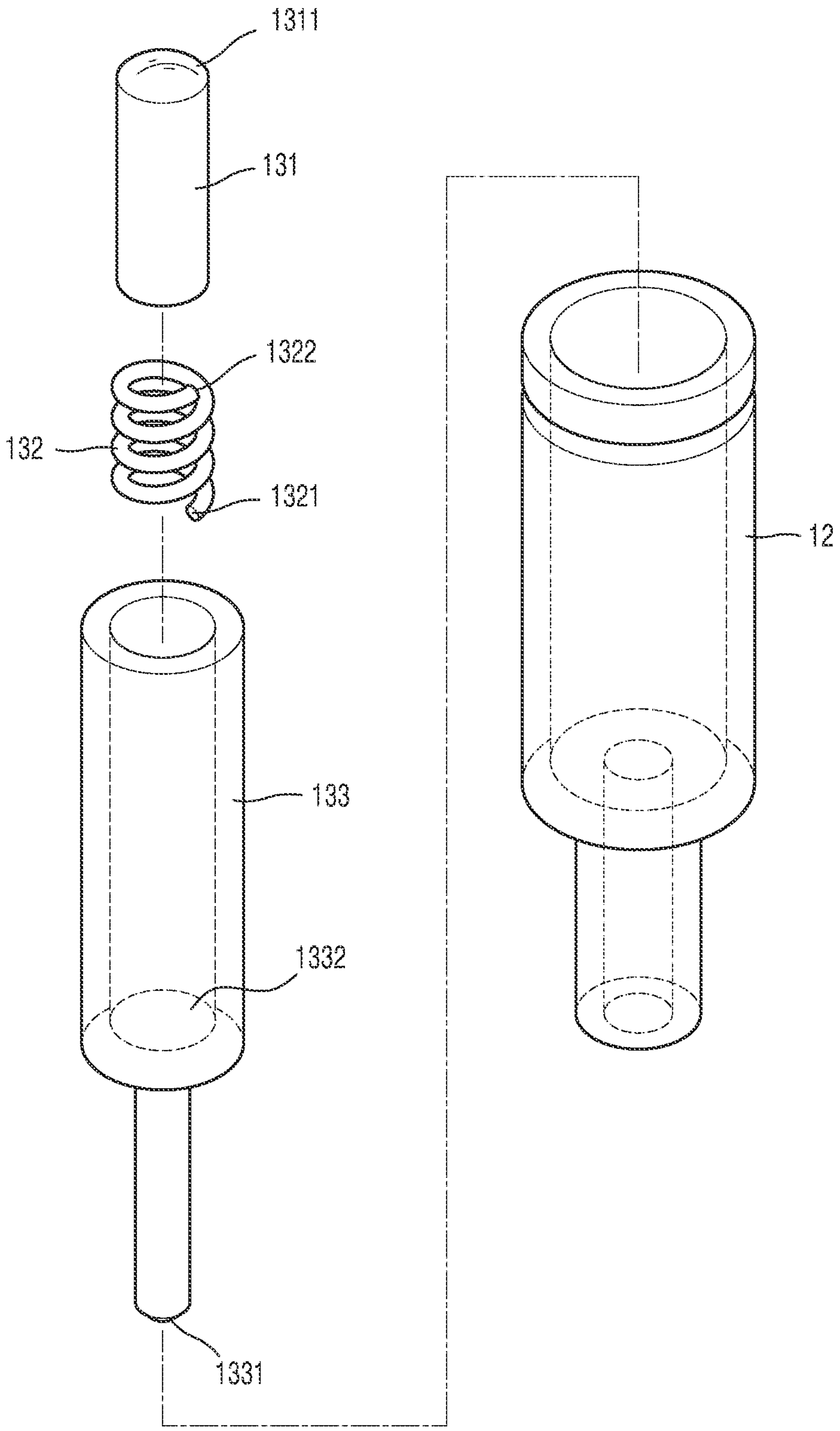
FIG. 4 is an exploded perspective view of an inner conducting portion and an insulating portion according to an embodiment.
Figure 5:
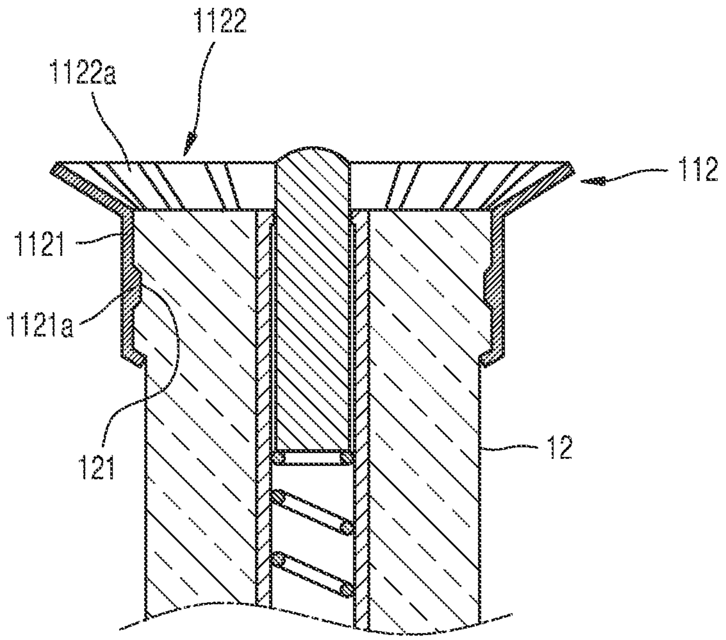
FIG. 5 is a partial cross-sectional view of an RF connector according to an embodiment.

FIG. 1 is a perspective view of a radio frequency (RF) connector 10 and a filter 20 according to an embodiment. FIG. 2 is a perspective view of the RF connector 10, the filter 20, and a printed circuit board (PCB) 30 according to an embodiment. FIG. 3 is a cross-sectional view of the RF connector 10, the filter 20, and the PCB 30 according to an embodiment. FIG. 4 is an exploded perspective view of an inner conducting portion 13 and an insulating portion 12 according to an embodiment. FIG. 5 is a partial cross-sectional view of the RF connector 10 according to an embodiment.

Referring to FIGS. 1 to 3, the RF connector 10 may include an outer conducting portion 11, the insulating portion 12, and the inner conducting portion 13. The outer conducting portion 11 has a cylindrical shape and is configured with an outer electric connecting end. The insulating portion 12 also has a cylindrical shape. The outer conducting portion 11 is disposed on an outer circumference of the insulating portion 12 to surround the insulating portion 12, and the inner conducting portion 13 is disposed inside the insulating portion 12 in a hollow shape. Accordingly, the insulating portion 12 may electrically separate the outer conducting portion 11 and the inner conducting portion 13 from each other. Electrical connectors disposed on both ends of the inner conducting portion 13 protrude from the insulating portion 12. Compared with the RF connector of the related art, the RF connector 10 may be integrated using the outer conducting portion 11 surrounding the outer circumference of the insulating portion 12, the insulating portion 12 and the inner conducting portion 13 disposed inside the insulating portion 12, thereby preventing the problem of large size of the RF connector caused by connection in an axial direction. When the filter 20 and the PCB 30 are connected, the RF connector 10 may be directly connected between the filter 20 and the PCB 30, and accordingly an assembly process may be simplified. In addition, the RF connector 10 according to an embodiment does not need a middle rod for connecting the filter 20 and the PCB 30, thereby effectively meeting design requirements of miniaturization and low-cost.

As shown in FIG. 3, an electric connecting end of the outer conducting portion 11 may be connected to the PCB 30. An electrical connecting portion disposed on one end of the inner conducting portion 13 is electrically connected to the PCB 30, and the other end of the inner conducting portion 13 is electrically connected to the filter 21. For example, as shown in FIG. 2, the PCB 30 may include an outer conductive connecting portion 31 and an inner conductive connecting portion 32. The electric connecting end of the outer conducting portion 11 is pressed to be adjacent to the outer conductive connecting portion 31. The electrical connecting portion disposed on one end of the inner conducting portion 13 is pressed to be adjacent to the inner conductive connecting portion 32. Accordingly, a RF signal may be transmitted.

As shown in FIGS. 1 to 3, the outer conducting portion 11 may include a metal shell 111 and an elastic conductive connector 112. The elastic conductive connector 112 may be disposed on at a port of the metal shell 111, for example, a part of the metal shell 111, and form the above-described electric connecting end. In other words, one end of the elastic conductive connector 112 may protrude from the port of the metal shell 111, and accordingly, the elastic conductive connector 112 may be used as the electric connecting end for electrical connection with the PCB 30.

The elastic conductive connector 112 according to an embodiment may include a cylindrical body 1121 and an elastic electrical contact 1122 protruding from one end of the cylindrical body 1121. The cylindrical body 1121 is disposed in close contact with the outer circumference of the insulating portion 12, and is electrically connected with the metal shell 111. At this time, the elastic conductive connector 112 may be disposed between the insulating portion 12 and the metal shell 111 to be pressed thereby, and accordingly, the elastic conductive connector 112 may be securely fixed. The elastic electrical contact 1122 protrudes from the port of the metal shell 111. As shown in FIG. 3, the elastic electrical contact 1122 is electrically connected to the PCB 30. The elastic electrical contact 1122 may be deformed in an axial direction of the cylindrical body 1121, and accordingly, the PCB 30 and the outer conducting portion 11 may be electrically connected reliably.

As shown in FIGS. 1 to 3, a plurality of elastic electrical contacts 1122 may be disposed along one end of the cylindrical body 1121 to be spaced apart from each other by a certain distance. That is, the outer conducting portion 11 may be electrically connected to the PCB 30 through the plurality of the elastic electrical contacts 1122. Moreover, the plurality of the elastic electrical contacts 1122 may be evenly arranged along the outer circumference of one end of the cylindrical body 1121, which may improve the reliability of the electrical connection between the outer conducting portion 11 and the PCB 30.

Further, a card slot 121 may be disposed in any one of the inner wall of the cylindrical body 1121 and the outer wall of the insulating portion 12. For example, the card slot 121 may include a groove shape extending in one direction. A bulge portion 1121*a* may be formed on the other one of the inner wall of the cylindrical body 1121 and the outer wall of the insulating portion 12. The bulge portion 1121*a* is disposed on the card slot 121 such that the relative positon of the elastic conductive connector 112 with respect to the insulating portion 12 may be restricted.

As shown in FIGS. 3 to 5, the bulge portion 1121*a* may be disposed on the inner wall of the cylindrical body 1121 according to an embodiment, and the card slot 121 may be disposed in the outer wall of the insulating portion 12. When the cylindrical body 1121 of the outer conducting portion 11 is inserted to slide toward the insulating portion 12, the bulge portion 1121*a* disposed on the inner wall of the cylindrical body 1121 may be restricted to the card slot 121 disposed on the outer circumferential surface of the insulating portion 12, thereby restricting positions of the outer conducting portion 11 and the insulating portion 12 in the axial direction. Further, the position of the elastic electrical contact 1122 protruding from one end of the RF connector 10 for electrical connection with the PCB 30 may be secured.

In order to restrict the position between the elastic conductive connector 112 and the insulating portion 12, the card slot 121 may be disposed in the inner wall of the cylindrical body 1121 and the bulge 1121*a* may be disposed on the outer wall of the insulating portion 12. As such, the position restricting effect is the same as described above, and thus a description thereof is omitted here.

For example, the elastic electrical contact 1122 may include a bent flange 1122*a* that may be formed to be inclined at a certain angle with respect to the outer wall of the cylindrical body 1121. As shown in FIGS. 1 to 3, on the one hand, because the elastic electrical contact 1122 includes the bent flange 1122*a*, manufacture processing may be further facilitated; and on the other hand, a contact area of the electrical connection between the PCB 30 and the elastic electrical contact 1122 may increase. Therefore, reliability of the electrical connection between the outer conducting portion 11 and the PCB 30 may be secured.

The structure of the inner conducting portion 13 is described in more detail below.

The inner conducting portion 13 may include a conductive column 131 extending in one direction, an elastic inner conductive connector 132, and a connecting tube 133. The conductive column 131 and the elastic inner conductive connector 132 are disposed inside the connecting tube 133. The elastic inner conductive connector 132 is pressed and the conductive column 131 and the connecting tube 133 are electrically connected.

Referring to FIGS. 3 and 4, the connecting tube 133 is stepped and inserted into a stepped hole of the insulating portion 12. One end of the connecting tube 133 is open, and a bottom portion 1332 facing the open end is formed to be closed. In other words, one end 1321 of the elastic inner conductive connector 132 is pressed against the bottom portion 1332 of the connecting tube 133, and the other end of the conductive column 131 is pressed against the other end 1322 of the elastic inner conductive connector 132. At this time, one end of the conductive column 131 protrudes from a tube entrance of the connecting tube 133. The protruding end of the conductive column 131 may form a first electrical connecting portion 1311. The other end of the connecting tube 133 may extend in one direction from the bottom portion 1332 and protrude from the insulating portion 12. The other end of the connecting tube 133 protruding from the insulating portion 12 forms a second electrical connecting portion 1331

The first electrical connecting portion 1311 formed by the conductive column 131 is pressed against the inner conductive connecting portion 32 of the PCB 30, and the second electrical contactor 1331 formed by the other end of the connecting tube 133 is electrically connected to an inner conductor 21 of the filter 20.

The conductive column 131 included in the inner conducting portion 13 may move in the axial direction using an elastic force of the elastic inner conductive connector 132, thereby ensuring that the inner conducting portion 13 is electrically connected to the PCB 30 reliably. For example, the elastic inner conductive connector 132 may be provided as an elastic member and compressed between the other end of the conductive column 131 and the bottom portion 1332 of the connecting tube 133.

As described above, according to the embodiments, the RF connector 10 may be further integrated using the outer conducting portion 11 surrounding the outer circumferential surface of the insulating portion 12, the insulating portion 12 and the inner conducting portion 13, thereby preventing the problem of large size of the RF connector caused by connection in the axial direction. When the filter 20 and the PCB 30 are connected, the RF connector 10 may be directly connected between the filter 20 and the PCB 30, and accordingly, an assembly process may be simplified. In addition, the RF connector 10 according to the embodiment does not need a middle rod for reconnection, which may effectively reduce a distance between the filter 20 and the PCB 30, and effectively meet design requirements of miniaturization and low-cost of the RF connector 10.

A base station device according to an example may include a RF module and a communication module, and may transmit at least one of data and signals between the RF module and the communication module through a specific interface defined on a packet basis. According to the present disclosure, a communication module including and the RF connector 10 according to an embodiment, the filter 20, and the PCB may be provided. The outer electric connecting end of the outer conducting portion 11 is electrically connected to the PCB 30. One end of the inner conducting portion 13 is electrically connected to the PCB 30, and the other end is electrically connected to the inner conductor 21 of the filter 20.

Because the description of the RF connector 10 in the above embodiment is based on the communication module formed by assembling the RF connector 10 with the filter 20 and the PCB 30, the communication module including the RF connector 10 may also share the technical effects corresponding to the above RF connector 10, and thus the description thereof is omitted here.

The above are exemplary embodiments of the present disclosure, and are not used for limiting the present disclosure. Any modifications, equivalents, improvements, etc., made under the principle of the present disclosure should be included in the protection scope of the present disclosure.

The invention claimed is:

1. A radio frequency (RF) connector comprising:
an insulating portion configured in a cylindrical shape;
an outer conducting portion configured in a cylindrical shape and disposed to surround an outer circumferential surface of the insulating portion; and
an inner conducting portion disposed inside the insulating portion in a hollow shape and having both ends protruding from the insulating portion,
wherein the insulating portion electrically separates the outer conducting portion and the inner conducting portion from each other,
wherein electrical connectors disposed on both ends of the inner conducting portion protrude from the insulating portion, and
wherein the outer conducting portion comprises:
a metal shell disposed to surround the outer circumferential surface of the insulating portion, and
an elastic conductive connector disposed in a part of the metal shell and electrically connected to the metal shell.

2. The RF connector of claim 1, wherein the elastic conductive connector comprises:
a cylindrical body disposed between the metal shell and the insulating portion; and
an elastic electrical contact protruding from one end of the cylindrical body.

3. The RF connector of claim 2,
wherein the elastic electrical contact comprises a plurality of elastic electrical contacts, and
wherein the plurality of elastic electrical contacts are disposed along one end of the cylindrical body to be spaced apart from each other by a certain distance, and are inclined at a certain angle with respect to an outer wall of the cylindrical body.

4. The RF connector of claim 2, further comprising:
a card slot disposed in any one of an inner wall of the cylindrical body and an outer wall of the insulating portion; and
a bulge portion disposed on the other one of the inner wall of the cylindrical body and the outer wall of the insulating portion and inserted into the card slot.

5. The RF connector of claim 2, wherein the elastic electrical contact comprises a bent flange inclined at a certain angle with respect to an outer wall of the cylindrical body.

6. The RF connector of claim 1,
wherein the inner conducting portion comprises:
a conductive column extending in one direction;
a connecting tube into which the conductive column is inserted through an open end; and
an elastic inner conductive connector disposed between the conductive column and a closed bottom portion of the connecting tube facing one end of the connecting tube, and
wherein the elastic inner conductive connector electrically connects the conductive column to the connecting tube.

7. The RF connector of claim 6,
wherein one end of a conductor column protruding from one end of the connecting tube is a first electrical connecting portion; and
wherein the other end of the connecting tube protruding from the insulating portion is a second electrical connecting portion.

8. The RF connector of claim 6, wherein the elastic inner conductive connector is an elastic member disposed between the conductive column and the bottom portion of the connecting tube and compressed or tensioned.

9. A communication module comprising:
a radio frequency (RF) connector;
a filter electrically connected to the RF connector; and
a printed circuit board (PCB) electrically connected to the RF connector,
wherein the RF connector comprises:
an insulating portion configured in a cylindrical shape;
an outer conducting portion configured in a cylindrical shape and disposed to surround an outer circumferential surface of the insulating portion; and
an inner conducting portion disposed inside the insulating portion in a hollow shape and having both ends protruding from the insulating portion, wherein the insulating portion electrically separates the outer conducting portion and the inner conducting portion from each other, wherein electrical connectors disposed on both ends of the inner conducting portion protrude from the insulating portion, and wherein the outer conducting portion comprises:

a metal shell disposed to surround outer circumferential surface of the insulating portion, and an elastic conductive connector disposed in a part of the metal shell and electrically connected to the metal shell.

10. The communication module of claim 9, wherein the outer conducting portion is electrically connected to the PCB, one end of the inner conducting portion is electrically connected to the filter, and the other end of the inner conducting portion is electrically connected to the PCB.

11. The communication module of claim 10, wherein the PCB comprises an inner conductive connecting portion and an outer conductive connecting portion disposed to surround the inner conductive connecting portion, and wherein the inner conductive connecting portion is electrically connected to the other end of the inner conducting portion, and the outer conductive connecting portion is electrically connected to the outer conducting portion.

12. The communication module of claim 9, wherein the elastic conductive connector comprises:

a cylindrical body disposed between the metal shell and the insulating portion; and an elastic electrical contact protruding from one end of the cylindrical body.

13. The communication module of claim 12, wherein the elastic electrical contact is electrically connected in a circumferential direction of the outer conductive connecting portion included in the PCB.

14. The communication module of claim 12, wherein the elastic electrical contact comprises a plurality of elastic electrical contacts, and wherein the plurality of elastic electrical contacts are disposed along one end of the cylindrical body to be spaced apart from each other by a certain distance, and are inclined at a certain angle with respect to an outer wall of the cylindrical body.

15. The communication module of claim 12, further comprising:

a card slot disposed in any one of an inner wall of the cylindrical body and an outer wall of the insulating portion; and a bulge portion disposed on the other one of the inner wall of the cylindrical body and the outer wall of the insulating portion and inserted into the card slot.

16. The communication module of claim 12, wherein the elastic electrical contact comprises a bent flange inclined at a certain angle with respect to an outer wall of the cylindrical body.

17. The communication module of claim 9, wherein the inner conducting portion comprises:

a conductive column extending in one direction;

a connecting tube into which the conductive column is inserted through an open end; and an elastic inner conductive connector disposed between the conductive column and a closed bottom portion of the connecting tube facing one end of the connecting tube, and wherein the elastic inner conductive connector electrically connects the conductive column to the connecting tube.

18. A base station device comprising:

a radio frequency (RF) module; and a communication module configured to transmit at least one of data and a signal through the RF module and a specific interface defined on a packet basis, wherein the communication module comprises:

an RF connector;

a filter electrically connected to the RF connector; and a printed circuit board (PCB) electrically connected to the RF connector, wherein the RF connector comprises:

an insulating portion configured in a cylindrical shape;

an outer conducting portion configured in a cylindrical shape and disposed to surround an outer circumferential surface of the insulating portion; and an inner conducting portion disposed inside the insulating portion in a hollow shape and having both ends protruding from the insulating portion, wherein the insulating portion electrically separates the outer conducting portion and the inner conducting portion from each other, wherein electrical connectors disposed on both ends of the inner conducting portion protrude from the insulating portion, and wherein the outer conducting portion comprises:

a metal shell disposed to surround outer circumferential surface of the insulating portion, and an elastic conductive connector disposed in a part of the metal shell and electrically connected to the metal shell.

* * * * *